Figure 1:
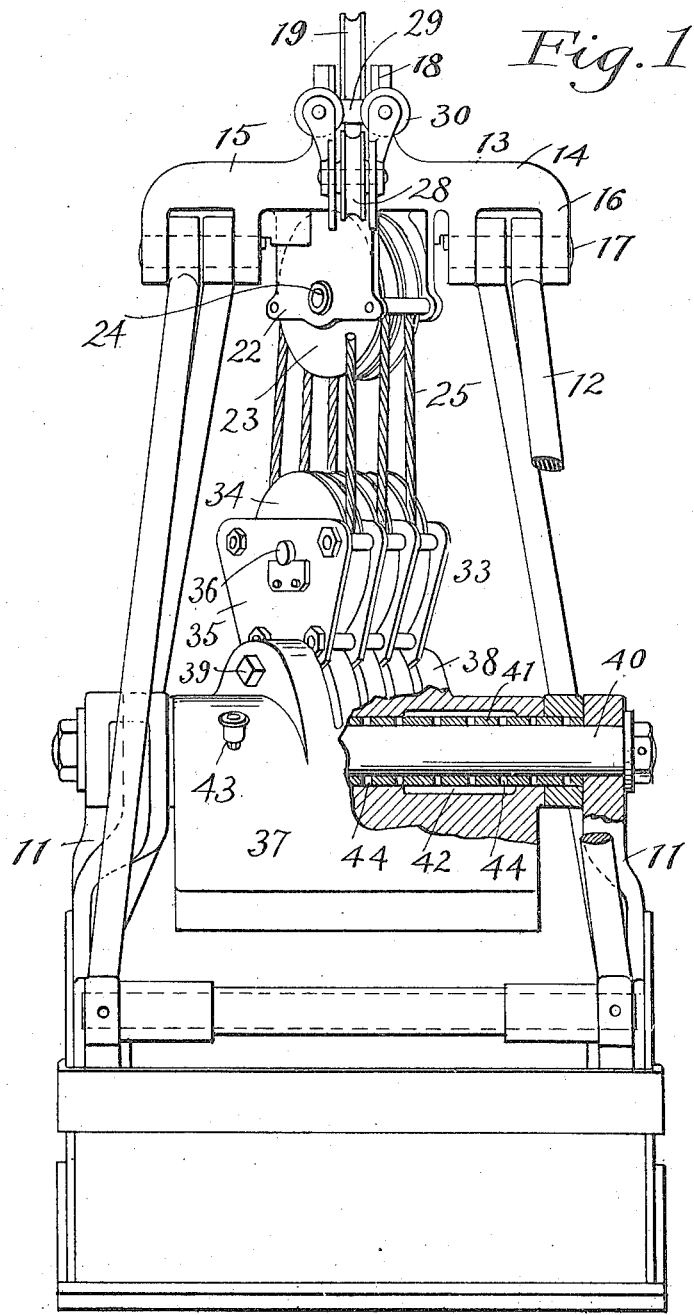

W. H. BOTTEN.
GRAB BUCKET.
APPLICATION FILED JULY 15, 1915.

1,248,605.

Patented Dec. 4, 1917.
2 SHEETS—SHEET 1.

Inventor
William H. Botten
by Thurston & Kwis
Attys.

W. H. BOTTEN.
GRAB BUCKET.
APPLICATION FILED JULY 15, 1915.
1,248,605.
Patented Dec. 4, 1917.
2 SHEETS—SHEET 2.
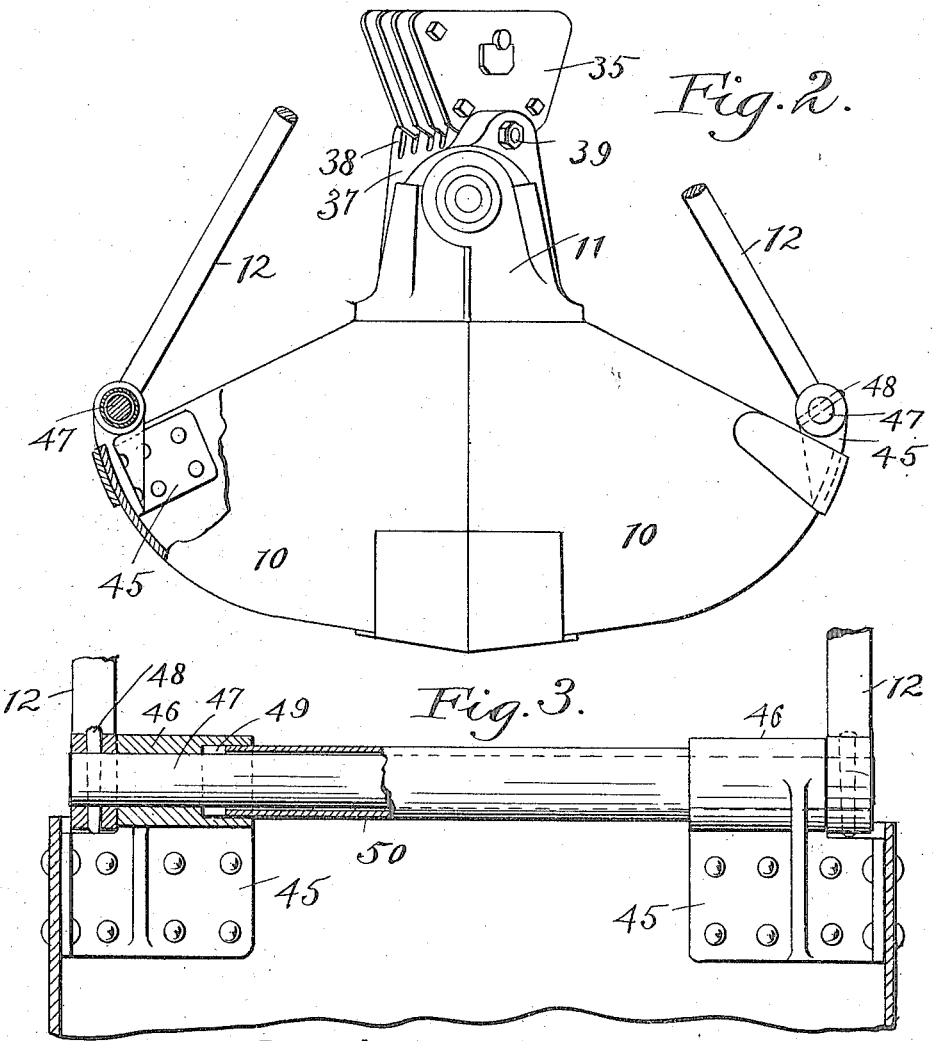
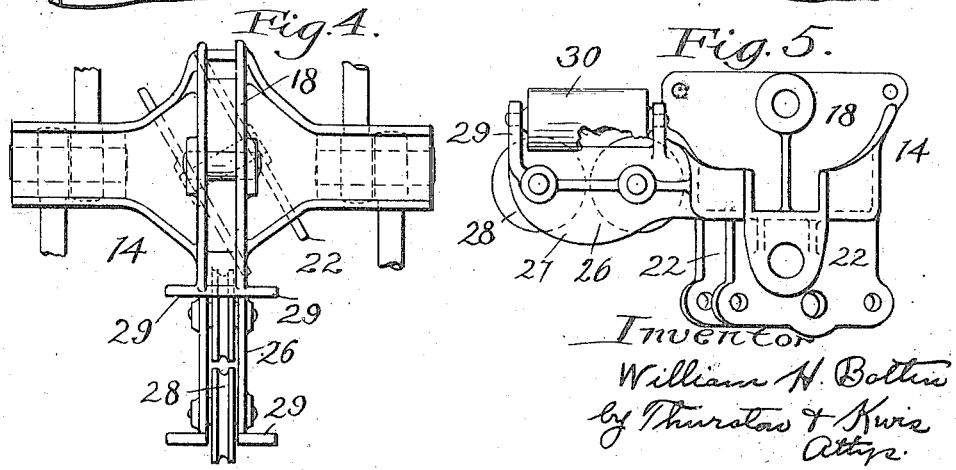
Inventor
William H. Botten
by Thurston & Kwis
Attys.

UNITED STATES PATENT OFFICE.

WILLIAM H. BOTTEN, OF CLEVELAND, OHIO, ASSIGNOR TO THE OWEN BUCKET COMPANY, OF CLEVELAND, OHIO, A CORPORATION OF OHIO.

GRAB-BUCKET.

1,248,605.  Specification of Letters Patent.  Patented Dec. 4, 1917.

Original application filed December 22, 1914, Serial No. 878,630. Divided and this application filed July 15, 1915. Serial No. 39,954.

*To all whom it may concern:*

Be it known that I, WILLIAM H. BOTTEN, a citizen of the United States, residing at Cleveland, in the county of Cuyahoga and State of Ohio, have invented a certain new and useful Improvement in Grab-Buckets, of which the following is a full, clear, and exact description.

This invention relates to grab buckets which are employed for digging, dredging, loading and unloading and rehandling purposes, and has for its main object to improve the construction, efficiency and durability of buckets of this type. As to a portion of the construction herein disclosed this application is a division of a prior application filed by me on the 22nd day of December, 1914, Serial No. 878,630, and entitled "Grab bucket."

One of the more specific objects of the present invention is to provide improved means for supporting the bucket jaws by providing bearings for the bucket hinges and for the arms connecting the bucket to the head, which have long life and can be lubricated without danger of attracting sand and other foreign particles liable to cut the bearings or bearing bushings. A further object is to provide bearings which prevent the so-called lapping of the jaws and eliminate the necessity for frequent replacement of the hinges and bearings of the hinge connections by which the jaws are pivotally connected together, and of the corner brackets and arm bearings by which the supporting arms are connected to the outer portions of the jaws. A still further object is to decrease friction on the working posts and increase the digging power of the bucket. Additionally the invention aims to strengthen and reinforce the rear portions of the bucket jaws.

The above and other objects are accomplished by my invention which may be briefly summarized as consisting in certain novel details of construction and combinations and arrangements of parts which will be described in the specification and set forth in the appended claims.

In the accompanying sheet of drawings, Figure 1 is a front view looking toward one of the jaws, parts being in section; Fig. 2 is a similar view of the lower part of the bucket with the bucket turned 90° from the position shown in Fig. 1, parts being in section; Fig. 3 is an enlarged detail view with parts in section, illustrating the bearings for the arms connecting the jaws to the head; Fig. 4 is a top plan view of the bucket head with two guide rollers removed; and Fig. 5 is a side view of the same turned 90° from the position shown in Fig. 1.

Referring now to the drawings, 10 represents the two bucket jaws, the inner portions of which are provided with hinges or hinge-pieces 11 and the outer corners of which are connected by rods 12 to the bucket head designated as a whole by the reference character 13. The bucket head 13 comprises a head-piece or body 14, preferably a steel casting formed in one integral piece. The head-piece 14 is provided with two integral laterally extending arms 15, each having a pair of downwardly extending ears 16 to which the upper ends of the arms 12 are connected by pins 17. Projecting upwardly from the middle portion of the head-piece 14 are two integral plates 18 which receive between them a holding and hoisting sheave 19 which is rotatably supported between the plates 18 and is adapted to receive a holding and hoisting line not shown. It will be observed that this sheave is at right angles to the axis of the head-piece 14, *i. e.*, the axis of the laterally projecting arms 15.

Extending downwardly from the head-piece and located between the two pairs of ears 16 is a pair of integral plates 22 which are arranged in parallel planes at an angle of about 45° to the axis of the head-piece. These plates 22 receive between them sheaves 23 of what may be termed the upper closing block, the sheaves being supported on a pin 24 supported in and extending through the plates 22. These sheaves 23 receive a closing line 25 which is reeved about the sheaves 23 and about sheaves of the lower closing block to be referred to presently.

The head-piece is provided also with an integral extension 26 which extends laterally at right angles to the axis of the head-piece. This extension includes a pair of parallel plates 27 which receive between them a pair of lead sheaves 28 for the closing line 25. This lateral extension 26 is provided also with integral transverse ears or flanges 29 which receive between them and support a pair of guide rollers 30 (see Fig.

1), for the closing line. The construction of the head is such that a minimum number of separate parts are required and the head room occupied by the head is minimized due largely to the fact that the sheaves for the holding line and upper sheaves for the closing line are set well into the head piece and are quite close together.

The bucket closing tackle includes in addition to the upper closing block and closing line 25, a lower closing block 33 composed of a plurality of sheaves 34, the number of which is greater by one than the number of sheaves in the upper block. It may be here stated that the upper block may have any number of sheaves, two sheaves being here shown. For example, the upper block may have three sheaves and the lower block four sheaves. The sheaves of the lower block are spaced apart by a number of sheave plates 35 between which the sheaves 34 are supported by a pin 36 extending through alined openings in the sheave plates 35. The lower block is secured to the upper part of a counterweight 37 (to which the bucket jaws are connected, as will be described), this counterweight having at the top a series of spaced lugs 38 which receive between them and space apart the lower portions of the sheave plates 35 of the closing block 33, these sheave plates being secured to the lugs 38 by a bolt 39 which passes through alined openings in the series of lugs 38 and through alined openings provided in the sheave plates.

It will be observed that the lugs 38 are on an angle to the axis of the counterweight and that the lower block is in consequence skewed or turned with reference to the counterweight axis. The upper and lower closing blocks and the guide sheaves and guide rollers for the closing line are so arranged that all parts of the closing cable 25 extending between the sheaves of the upper and lower blocks and between the guide sheaves 28 and one of the end sheaves of the lower block have clear leads. It will be observed also that the portion of the closing line which extends downwardly through the closing line guide sheaves to the end sheave of the lower closing block is in the center plane of the bucket so that the bucket will stand plumb when it is supported by the closing line. This is true also when the bucket is supported by the holding line.

One of the important features of my invention resides in the manner of supporting and pivotally connecting the hinges 11. Heretofore the hinges have been mounted on the ends of a shaft or pin which in a bucket of the counterweight type as here shown extended through the counterweight. That construction, however, had the disadvantage that the bearing surfaces of the hinges were so small that wear necessitated the rather frequent replacement of the hinges, hinge bushings and shaft. Additionally, it was found difficult to maintain the edges of the jaws in alinement or to avoid lapping, and the lubrication of the bearing surfaces attracted sand which cut the bearing surfaces. These disadvantages are overcome by my invention wherein the means for pivotally connecting the hinges together or to the counterweight 37 consists of two concentric members, namely, a shaft 40 to the ends of which the two outside hinges extending from one jaw are fastened and a sleeve 41 which is somewhat shorter than the shaft and to the ends of which the other two inside hinges are fastened. Both the shaft and the sleeve extend through the counterweight, the shaft and sleeve having a suitably close working fit on each other, and the sleeve having a suitably close working fit in the counterweight. The opening in the counterweight is preferably recessed at two points, as shown at 42, this being provided for the purpose of reducing the length of the bearing surface of the sleeve and counterweight and for lubricating purposes. The recesses are preferably filled with a semi-solid lubricating substance, and additionally grease cups 43 may be provided to supply lubricant to these recessed portions. In order that lubricant may find its way from these recesses onto the inner bearing surfaces of the sleeve and shaft, the sleeve is provided with a number of lubricating openings 44.

By fastening the two pairs of hinges rigidly to the two long relatively movable members, one of which has a bearing in the other and both extending through the counterweight, very good bearings are provided for these parts throughout the life of the bucket, and there is practically no danger of the bucket jaws lapping or getting out of alinement as was heretofore the case if one corner of the bucket jaws would close on a rock or other hard substance. Additionally, by lubricating the bearing surfaces from what may be termed the interior of the structure, such a small percentage of the lubricant gets on the outer hinging parts that sand and grit will not be attracted to any material extent and cut the bearings.

Another important part of my invention resides in the bearings or hinges connecting the arms 12 to the outer portions of the jaws. Heretofore it has been customary to provide at the outer corners of the bucket so-called corner brackets which are riveted to the jaws and to which the lower ends of the arms were connected by pins, the pins extending between parallel ears carried by the corner brackets. With this construction the bearings would wear quite rapidly, requiring rather frequent replacement of the corner brackets, bushings and pins, and the corner brackets were frequently broken.

In accordance with the present invention

I provide at the outer corners of each jaw a pair of brackets 45 which are riveted to the sides as well as to the bottom of the bucket near the top or outer portions of the jaws. These brackets 45 are provided with horizontally disposed bearing bosses or heads 46 which are of ample length to provide good bearing surfaces and are above the jaws, i. e., above the plates forming the outer portions of the jaws. Extending through the two bearing bosses of each jaw and rotatably supported therein with a close working fit is a shaft 47 which extends beyond the ends of the bosses, the latter terminating short of the plates forming the sides of the bucket, as shown in Fig. 3. The lower ends of the two arms 12 which connect the jaw to the head fit tightly onto the outer projecting ends of the shaft 47 and are connected thereto by pins 48 or equivalent fastening means. The inner portion of the shaft opening in each bearing boss 46 is enlarged, forming an annular space 49 and fitted tightly into the enlarged portions of the openings of the two bearing bosses of each jaw, and loosely surrounding the shaft 47 is a sleeve 50. The annular space 49 may be filled with lubricant, which is prevented from escaping and running over the sides of the bearing members by the sleeve, although it may work between the shaft and sleeve from one bearing boss to the other. An important advantage of this sleeve lies in the fact that while it does not affect the flow of the lubricant to the bearings, it prevents the entrance of sand and grit between the bearing surfaces.

In view of the fact that the arms are fastened to this shaft, which has good and substantial bearing in the bearing bosses of the brackets 45, and in view of the manner in which the bearing surfaces are lubricated and sand and grit are excluded, these bearings have very long life and at the same time the construction is exceedingly strong and liability of breakage is minimized.

Additionally, the shafts 47 which extend entirely across the rear portions of the jaws and the sleeves 50 very materially strengthen and reinforce the jaws where heretofore they have been weak. With the ordinary hinge connections between the arms and outer corners of the bucket it has been found that the plates forming the rear portions of the jaws would occasionally bend, especially when the front digging plates bend as they often do when the jaws close upon and elevate rocks of unusual size. However, with the present construction all tendency for the rear plates to buckle or bend is eliminated.

With my improved hinge and arm bearings above described not only are the bearing parts more durable or less susceptible to wear, but due to the fact that the bearing surfaces can be lubricated where heretofore they were not lubricated to any material extent, the friction of the moving parts is very materially decreased and the power heretofore expended in overcoming friction is now employed for digging purposes, and it has been found that the digging power of the bucket is in fact very materially increased. Not only can the jaws be worked much faster, but a larger load can be picked up by the jaws.

Having thus described my invention, what I claim is:—

1. In a grab bucket, a pair of bucket jaws, a bucket head, arms connecting the jaws to the head, hinges attached to the jaws, a counterweight at the pivotal axis of the jaws, a sleeve extending through and journaled in the counterweight, a shaft extending through and journaled in the sleeve, two of said hinges being attached to the ends of the sleeve and two of the hinges being attached to the ends of the shaft and bucket closing means attached to the counterweight.

2. In a grab bucket, a pair of jaws, a bucket head, arms connecting the jaws to the head, hinges attached to the jaws, a counterweight at the pivotal axis of the jaws, a sleeve extending through and journaled in the counterweight, a shaft extending through and journaled in the sleeve, two of the hinges being connected to the ends of the sleeve, and two of the hinges being connected to the ends of the shaft, and a block attached to the counterweight and having sheaves for a bucket closing cable.

3. In a grab bucket, a pair of jaws, a bucket head, arms connecting the jaws to the head, hinges attached to the jaws, a counterweight at the pivotal axis of the jaws, a sleeve extending through and journaled in the counterweight, a shaft extending through and journaled in the sleeve, two of the hinges being connected to the ends of the sleeve, and two of the hinges being connected to the ends of the shaft, the sleeve having lubricant passageways whereby a lubricant supplied to the inner part of the counterweight may lubricate the bearing surfaces of the sleeve and shaft.

4. In a grab bucket, a pair of bucket jaws, a bucket head, arms connecting the jaws to the head, hinges attached to the jaws, a counterweight at the pivotal axis of the jaws, a sleeve extending through and journaled in the counterweight, a shaft extending through and journaled in the sleeve, two of the hinges being attached to the ends of the sleeve and two being attached to the ends of the shaft, said counterweight having a lubricant recess and the sleeve having openings through which lubricant may pass to the shaft.

5. In a grab bucket, a pair of bucket jaws having their inner portions hinged together, shafts extending across the outer portions of the jaws, bearings secured to the jaws and rotatably supporting the shafts, a bucket head, arms pivotally connected to the head and rigidly fastened at their lower ends to the ends of said shafts.

6. In a grab bucket, a pair of bucket jaws having their inner portions hinged together, brackets secured to the outer corners of the jaws and provided with horizontally extending bearing bosses, a shaft journaled in the two bosses of the brackets of each jaw and extending across the outer portion of the jaw, a bucket head, and two pairs of arms connected to the head and rigidly secured to the outer portions of the shafts.

7. In a grab bucket, a pair of bucket jaws having their inner portions connected together, horizontally disposed bearings at the outer corners of the bucket, a horizontal sleeve fitted in the adjacent ends of the bearings of each jaw, a shaft journaled in the bearings and extending through the sleeve, a bucket head, and two pairs of arms connected to the head and fastened to the ends of the shafts.

8. In a grab bucket, a pair of bucket jaws having their inner portions connected together, horizontally disposed bearings at the outer corners of the jaws each having an opening for a shaft with the inner end of the opening enlarged, a shaft extending between and journaled in the two bearings of each jaw, a sleeve loosely surrounding each shaft and fitted into the enlarged portions of the openings of the corresponding pair of bearings, a bucket head, and pairs of arms connected to the head and fastened to the ends of the shafts adjacent the outer ends of the bearings.

9. In a grab bucket, a pair of bucket jaws having their inner portions connected together, horizontally disposed bearings at the outer corners of the jaws each having a shaft opening with the inner end of the opening enlarged so as to form an annular space for lubricant, shafts journaled in said bearings and each extending across the rear portion of one of the jaws, a bucket head, arms connected to the head and fastened to the ends of the shaft adjacent the outer ends of the bearings, and means for preventing the lubricant spreading over the outer surfaces of the bearings.

In testimony whereof, I hereunto affix my signature in the presence of two witnesses.

WILLIAM H. BOTTEN.

Copies of this patent may be obtained for five cents each, by addressing the "Commissioner of Patents, Washington, D. C."